United States Patent

[11] 3,614,624

[72] Inventor Frank A. Scarpino
Dayton, Ohio
[21] Appl. No. 811,894
[22] Filed Apr. 1, 1969
[45] Patented Oct. 19, 1971
[73] Assignee The National Cash Register Company
Dayton, Ohio

[54] DEVICE FOR TRANSLATING BINARY DATA TO A JITTER-CONTROLLED ASYNCHRONOUS FREQUENCY MODULATED SIGNAL
13 Claims, 5 Drawing Figs.

[52] U.S. Cl. .......... 325/163, 178/66
[51] Int. Cl. .......... H04l 27/12
[50] Field of Search .......... 325/30, 163; 178/66, 67, 66 A; 331/179; 332/14

[56] References Cited

UNITED STATES PATENTS

| | | | |
|---|---|---|---|
| 3,518,552 | 6/1970 | Carlow | 325/163 |
| 3,493,679 | 2/1970 | Chomicki | 325/30 |
| 3,417,332 | 12/1968 | Webb | 178/66 |
| 3,205,441 | 9/1965 | Likel | 325/163 |

*Primary Examiner*—Robert L. Griffin
*Assistant Examiner*—James A. Brodsky
*Attorneys*—Louis A. Kline and Albert L. Sessler, Jr.

ABSTRACT: A circuit for translation of binary data signals to a jitter-controlled frequency modulated output signal comprises means producing a first clock signal divided by passing the same through a counter or scaler which provides an output each time a predetermined number of clock cycles has been received thereby. The successive outputs of the scaler shift a bistable element such as a flip-flop to produce an output square wave representing a first of two frequencies of the frequency modulated output signal. The second frequency of the output signal is derived from a second clock signal of different frequency divided through the same scaler, or, in the alternative, from the same clock signal divided through a second scaler of different predetermined cycle capacity. In the latter case, one scaler idles while the other scaler generates an output wave and additional clock signals are employed, as required, to advance the idling scaler to maintain phase continuity for the instant of a shift in data signals so that the new wave generated through the previously idling scaler will have at least approximate phase continuity with the old wave.

INVENTOR
FRANK A. SCARPINO
BY Louis A Kline
Albert L Sessler
HIS ATTORNEYS

INVENTOR
FRANK A. SCARPINO
BY Louis A. Kline
Albert L. Sessler
HIS ATTORNEYS

INVENTOR
FRANK A. SCARPINO
BY Louis A Kline
Albert L Sessler
HIS ATTORNEYS

INVENTOR
FRANK A. SCARPINO

BY

HIS ATTORNEYS

DEVICE FOR TRANSLATING BINARY DATA TO A JITTER-CONTROLLED ASYNCHRONOUS FREQUENCY MODULATED SIGNAL

This invention relates to a device for translating binary data to a frequency modulated signal suitable for transmission, as by telephone lines, to a remote receiver; however, the invention is not necessarily so limited.

In transmission systems of the type to which the present invention relates, the transmitter recognizes the data signals being received by recognizing changes between two available voltage levels. A high-voltage voltage input is conveniently referred to as a mark and a low-voltage input referred conveniently referred to as a space. Therefore, the data input may be regarded as a sequence of marks and spaces which may have varying time durations.

In frequency modulation systems for transmitting data of this type, it has become the industry practice to convert mark signals to a low-frequency output wave and to convert space signals to a high-frequency output wave. For convenience, then, the present invention is described in reference to a transmitter which, upon receipt of a high input voltage (a mark), transmits a low-frequency signal and, upon receipt of a low input voltage (a space), transmits a high-frequency signal. However, the reverse relation between voltages and frequencies, where required by associated equipment, is also comprehended by the present invention.

At the receiver for the transmitted data the zero crossings of the frequency modulated wave being received are continuously monitored. If the time average of successively monitored zero crossings corresponds with that expected from the low-frequency mark signal, the receiver reports receipt of a mark. If the time average of successively monitored zero crossings is the smaller time interval representing that expected from the high-frequency space signal, the receiver reports receipt of a space. If the average of successively monitored zero crossings at the receiver is intermediate that expected for a mark and that expected for a space, the receiver reports a mark if the intermediate time interval is closer to that expected for a mark signal and reports a space if the intermediate time interval is closer to that expected for a space signal.

The signal being reported at the receiver is periodically inspected or sampled, The accuracy of the data transmission system depends upon the accuracy of the mark or space report at the instant the sampling is made. A common cause of inaccuracy is signal jitter, sometimes referred to as overlap ambiguity. Signal jitter results when, during a frequency shift at the transmitter, the new frequency to which the transmitter is shifting is not in phase with the old frequency from which the transmitter is shifting. When this phase discontinuity occurs the wave being transmitted goes through an irregular frequency transition that may disturb the form of the wave over several half-cycles. In this event, the receiver measures intermediate time intervals between the expected mark and space intervals and may fail to accurately identify the signal which the transmitter is attempting to transmit. Thus, the receiver may report a space when in fact the transmitter is endeavoring to transmit a mark, and vice versa.

If the report of the receiver is being sampled during the time of a jitter, the possibility of a sampling error is substantial. To a certain extent the effects of such jitter can be minimized by controlling the voltage shifts at the data input to accurately spaced intervals and synchronizing the sampling mechanism at the receiving end so that it will sample only between data shifts and not near a data shift. However, this is only a partial remedy since, in the absence of some control over jitter, the signal ambiguity may exist throughout the entire interval between frequency shifts.

An alternate approach to minimizing or eliminating the problems associated with jitter is to allow a frequency shift to occur only at specified phase angles of the wave being transmitted, e.g., at zero crossings only, so that the frequency shift can occur only at times when the new wave will have phase continuity with the old wave. Such shifting or keying is known in the art as synchronous keying. Synchronous keying can be used to substantially eliminate jitter; however, it requires that the carrier frequency be an integral multiple of both modulating frequencies and thus limits the available values for the modulating frequencies.

An object of the present invention is to provide an improved data transmission system.

Another object of the present invention is to provide a frequency shift keying mechanism which enables asynchronous keying.

A further object of the present invention is to provide an asynchronous frequency shift keying mechanism which reduces jitter to within controlled limits.

Other objects and advantages reside in the construction of parts, the combination thereof, the method of manufacture and the mode of operation, as will become more apparent from the following description.

In the drawings, Figure 1 is a schematic diagram of an electrical circuit embodying the present invention. For convenience of illustration, this figure is presented in two parts labeled FIG. 1(*a*) and FIG. 1(*b*), respectively.

Figure 1A:
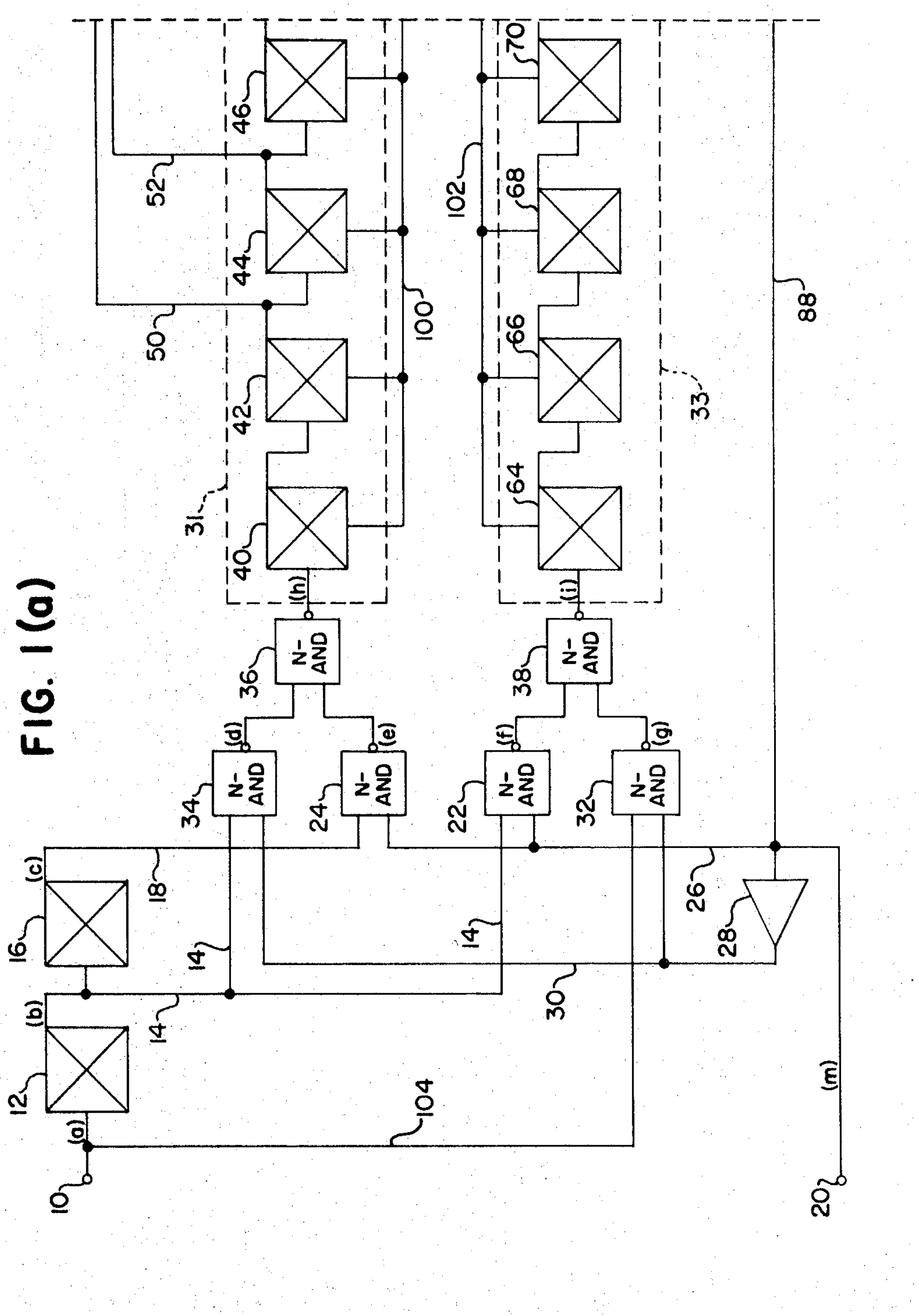
Figure 1B:
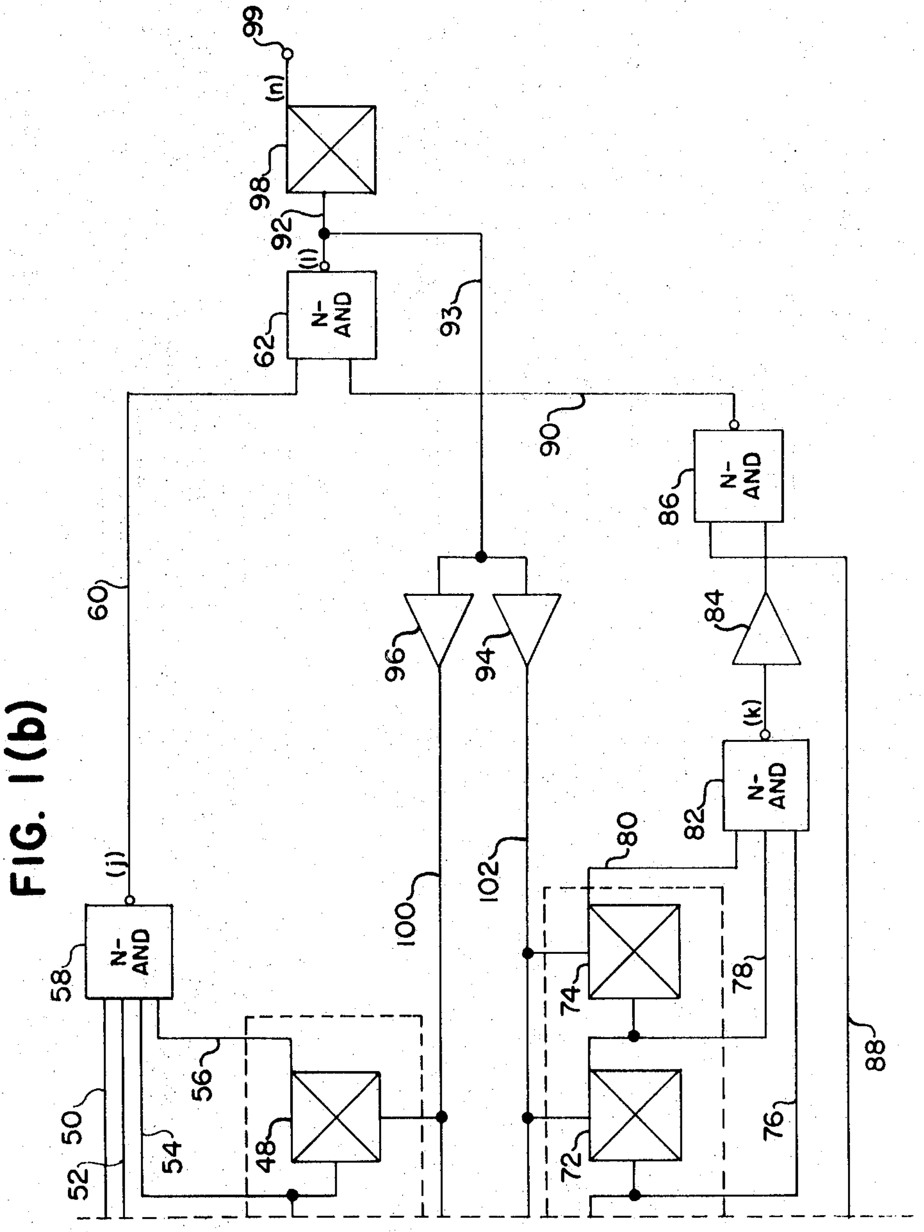

Referring to Figure 1, the terminal or conductor marked with the reference character 10 represents a clock input terminal to which a digital signal, hereinafter called the master clock, is applied. This master clock is desirably derived from a crystal controlled oscillator (not shown). The output of the oscillator is preferably formed into what is essentially a square wave as by overdriving or passage through a flip-flop. A representative waveform for the master clock appears in FIG. 2(*a*).

The master clock is divided through a first bistable device or flip-flop 12 to provide a signal at the conductor 14, hereinafter referred to as the half-clock. The half-clock waveform appears in FIG. 2(*b*). The half-clock is further divided through a second flip-flop 16 to provide at the conductor 18 a third signal, hereinafter referred to as the quarter-clock. The waveform of the quarter-clock appears in FIG. 2(*c*).

Figure 2:
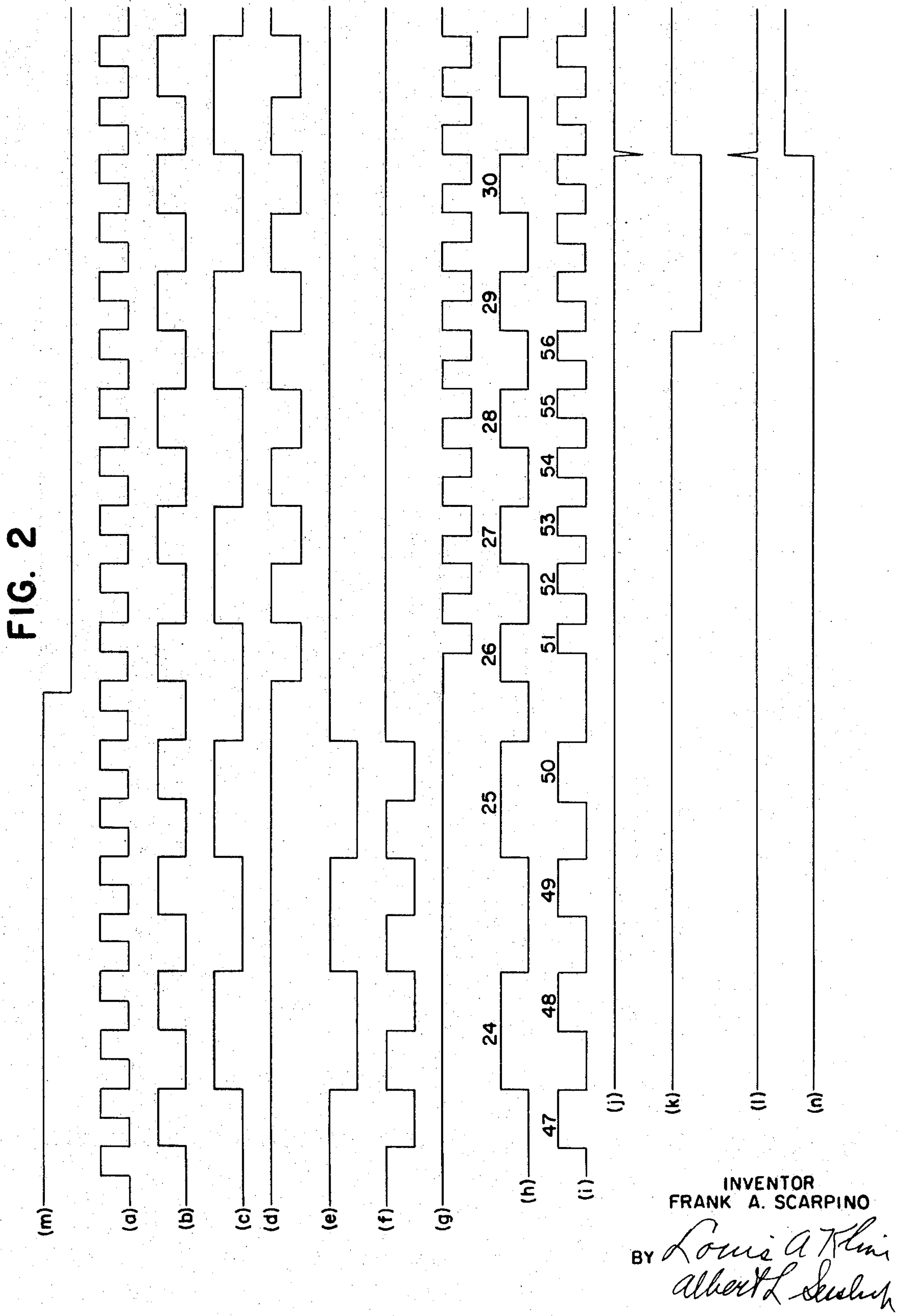
FIG. 2 is a diagram illustrating various waveforms explanatory of the operation of the embodiment of FIG. 1.
Figure 3:
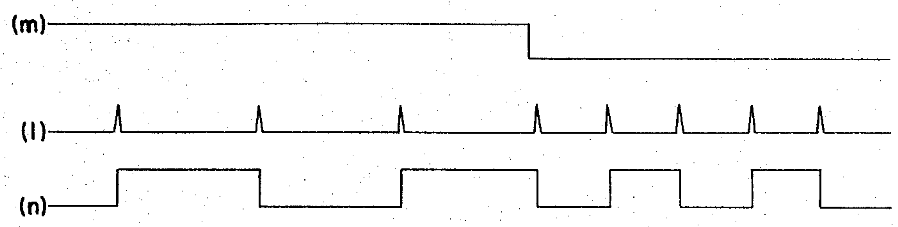
FIG. 3 is a diagram of certain of the waveforms drawn to a different time scale to further illustrate the operation of the embodiment of FIG. 1.

For easy reference, the conductors of FIG. 1 at which the FIG. 2 and 3 waveforms appear have been marked with the same letters as identify the waveforms in FIGS. 2 and 3.

The assembly of flip-flops 12 and 16, together with their connecting means, and the clock signal to terminal 10 represent a means to produce a first pair of signals (master clock and half-clock) having a frequency difference and a second pair of signals (half-clock and quarter-clock) having a frequency difference, the ratio of frequencies being the same in each pair.

As will appear more clearly in a later portion of this specification, the first and second signal pairs are employed to achieve a nearly jitter-free asynchronous frequency shift in a frequency modulated output signal. Such frequency shifts are caused to occur in response to voltage shifts in binary data input to a terminal 20. A portion of a representative line of binary data appears in FIG. 2(*m*). A further representation drawn to a greatly reduced scale appears in FIG. 3(*m*). In the ensuing description, it will be convenient to refer to the upper and lower levels of the data line as positive and negative voltages or states. As known to those skilled in the art, however, the voltage levels are not necessarily of opposite polarity. As sometimes conventional in the trade, the negative voltage level, which may in fact be zero, or a lower positive voltage is herein referred to as a space and the higher voltage level is herein referred to as a mark. It is equally conventional, of course, to employ other terminology such as "0" and "1" or "-true" and "false" in reference to the data input levels.

As appears in FIG. 1, the voltage of the input data is applied directly to N-AND gates 22 and 24 through a conductor 26. The input data is also inverted through an inverter 28 so that the inverse or complement of the data is applied through conductor 30 to N-AND gates 32 and 34.

In terms of the periods of the clock frequencies appearing on the conductors 10, 14 and 18 associated with the master clock, the space and mark data input to the terminal 20 may be regarded as steady states since these data states endure for a long period of time in relation to the clock frequency. As well understood in the art, a steady negative signal to either input terminal of a N-AND gate "disables" the N-AND gate in the sense that, regardless of the signal being applied to the other input terminal, the N-AND gate will have a steady positive output. On the other hand, if one input terminal to the N-AND gate is steady positive while the other input terminal may shift between negative and positive levels, the N-AND gate is "enabled" in the sense that the output of the N-AND gate will shift in accordance with the shifting input, the N-AND gate output always representing the inverse or complement of the shifting input. Accordingly, when the data input at 20 is a mark, the N-AND gates 22 and 24 can be considered as "enabled" for the purposes of the present invention since these gates are capable of transmitting a clock frequency. To the contrary, the N-AND gates 32 and 34 may be regarded as "disabled" since their outputs are steady positive and incapable of transmitting a clock frequency.

When the data input is a space, the N-AND gates 22 and 24 are "disabled" to transmit a clock frequency, but the N-AND gates 32 and 34 are "enabled" to transmit a clock frequency.

With reference to FIGS. 2 and 3 which show waveforms achieved at various points in the circuit of FIG. 1, the waveforms are drawn as if time passes or increases in moving from left to right. With reference to the data line (*m*), the circuit will be described as if presently receiving a positive voltage (or mark). Halfway across the waveform illustrations of FIG. 2, a mark to space data shift occurs and the behavior of the circuit in response to this data shift will later be described.

Since the circuit is being described as presently receiving a positive voltage, the N-AND gates 22 and 24 are presently enabled and the N-AND gates 32 and 34 are presently disabled.

As is apparent in FIG. 1, the N-AND gate 22 receives the half-clock frequency through the conductor 14 and the N-AND gate 24 receives the quarter-clock frequency through the conductor 18. Accordingly, so long as a positive voltage or mark remains at the input terminal 20, a N-AND gate 36 has one of its inputs steady positive from the output of the N-AND gate 34 and the other of its inputs shifting between negative and positive at the quarter-clock frequency received from the N-AND gate 24. The N-AND gate 36 is therefore enabled and has an output which shifts between negative and positive at the quarter-clock frequency.

In similar fashion a N-AND gate 38 has one of its inputs steady positive from the N-AND gate 32, and another of its inputs shifting at the half-clock frequency from N-AND gate 22, so as to have a shifting output at the half-clock frequency.

Within FIG. 2 the waveforms (*d*), (*e*), (*f*) and (*g*) represent the outputs of the N-AND gates 34, 24, 22 and 32, respectively. The waveforms (*h*) and (*i*) in FIG. 2 represent the outputs of the N-AND gates 36 and 38, respectively.

The output of the N-AND gate 36 is applied to a scaler or cycle counter 31 comprising bistable flip-flops 40, 42, 44, 46 and 48. As frequently conventional, the flip-flops provide a triggering output to the next in line on termination or fall-off of each pulse received thereby. The waveforms in FIG. 2 reflect this characteristic, but those skilled in the art will recognize that the precise operation of the scaler is unimportant in the practice of the present invention, the important feature residing in the capability of the scaler to provide output pulses which are spaced at measured time intervals.

In order to cause the scaler 31 to output a pulse on termination of the 30th pulse thereto, conductors 50, 52, 54 and 56 connect the outputs of the flip-flops 42, 44, 46 and 48, respectively, to a N-AND gate 58 having four input terminals. When these inputs are all positive, as will first occur at termination of the 30th pulse thereto, the N-AND gate 58 which had been giving a positive output will shift to a negative output applying a negative pulse through a conductor 60 to a N-AND gate 62.

At the same time the above-described scaler 31 operation is taking place, the N-AND gate 38 is providing an output shifting between positive and negative states at the half-clock frequency. This output is supplied to a second scaler or cycle counter 33. The scaler 33 employs six flip-flops numbered 64, 66, 68, 70, 72 and 74. The outputs of the flip-flops 70, 72 and 74 are applied through conductors 76, 78 and 80, respectively, to a N-AND gate 82 having three input terminals. In consequence, the N-AND gate 82, which normally has a positive output, delivers a negative pulse after the 56th count of the scaler 33. This negative pulse from the output of the N-AND gate 82 is inverted through an inverter 84 and applied to one input of a N-AND gate 86.

Recalling that the circuit is being described with reference to a positive voltage at the input data line, a conductor 88 applies this positive voltage to the other input line for the N-AND gate 86. In effect, the conductor 88 has enabled the N-AND gate 86 so that upon termination of the 56th pulse to the scaler 33, the output of the N-AND gate 86 to a conductor 90 will shift negative.

While the circuit is being described with reference to a positive data input, one should also recognize that at some point prior in time the data input had shifted from a negative to a positive voltage level. Referring to the instant at which this negative to positive shift occurred, assume both the scaler 31 and the scaler 33 commenced counting from zero, the scaler 33 counting toward 56 twice as fast as the scaler 31 counts toward 30. Since the scaler 33 is only counting toward 56, it will reach and output a pulse at the count 56 before the scaler 31 can output any pulse.

As the scalers are counting the outputs of the N-AND gates 58 and 86 are both positive and accordingly the output of the N-AND gate 62 is negative. When the scaler 33 outputs a pulse at the count 56, however, the N-AND gate 86 is enabled so as to produce a negative voltage on the conductor 90. In turn, this negative voltage disables the N-AND gate 62 producing a positive voltage on the conductor 92. The presence of a positive voltage on the conductor 92 has two consequences. The conductor 92 serves as a trigger to an output flip-flop 98. Whatever voltage the flip-flop was priorly applying to its output at the terminal 99 is shifted to a different value. At the same time the positive voltage on the conductor 92 is passed through conductor 93 to inverters 94 and 96. Inverter 96 causes a negative voltage to appear on the conductor 100. Conductor 100 is a conventional reset line which, when shifting to negative, resets the scaler 31 to zero. Inverter 94 applies a negative voltage to conductor 102 which is a reset line for the scaler 33.

Summarizing, then, the appearance of a positive voltage on the conductor 92 causes the output flip-flop 98 to shift its voltage output at the same time causes the scalers 31 and 33 to reset to their zero count level or state.

Since both scalers reset to zero each time the scaler 33 outputs its count of 56, the scaler 31 is unable to count out to its count of 30 and, so long as the data input remains positive, the output flip-flop 98 will shift states at a frequency equal to the half-clock frequency divided by 56, i.e., the master clock frequency divided by 112.

The output flip-flop 98 thus generates a square wave whose frequency is 1/224 the master clock frequency so long as the data input is positive. This square wave, which is best illustrated in the left half of FIG. 3(*n*), constitutes the frequency modulated output for a positive data input, that is, for a mark input.

When the data input shifts negative, as shown halfway across FIG. 2, the N-AND gate 22 is disabled and the N-AND gate 32 enabled. This permits the master clock to be passed through conductor 104 and the N-AND gate 32 (FIG. 2(*g*) waveform) to the N-AND gate 38. Accordingly, with the shift to a negative data input, the scaler 33, without having been reset, continues counting toward its count of 56, but at the master clock frequency (see FIG. 2(*i*) waveform).

With respect to the scaler 31, the shift to a negative data input has disabled the N-AND gate 24 and enabled the N-AND gate 34 to produce the waveform shown in FIG. 2(*d*). The result is that the half-clock frequency derived from the conductor 14 is now applied to the scaler 31 through the N-AND gate 36 (see FIG. 2(*h*)). A consequence of the shift to a negative data input is that the scaler 33 continues to count twice as fast as the scaler 31, but both scalers are counting twice as fast as they did during the period of positive data input.

Since the scaler 33 still counts twice as fast as the scaler 31, the scaler 33 will always reach its count of 56 sooner than the scaler 31 can reach its count of 30. However, the shift in data input from positive to negative has shifted the conductor 88 to a negative voltage level, thereby disabling the N-AND gate 86. With the N-AND gate 86 disabled, count-out of the scaler 33 to its count of 56 is without consequence since this count-out cannot produce a positive voltage on the conductor 92 as was the case when the data input was positive. Thus, the waveform in FIG. 2(*k*) shows a negative output from the N-AND gate 82 after count 56 is registered in the scaler 33, but this negative voltage is without consequence since the data input is now negative.

Since count-out of the scaler 33 to its count of 56 cannot effect a reset of the scalers 31 and 33, the scaler 31 can now count out to its full count of 30. Counting from the most recent output zero crossing, FIG. 2 illustrates a data shift occurring after the 25th quarter-clock cycle has been accumulated in the scaler 31 (see Figure 2(*h*)) and after the 50th half-clock cycle has been accumulated in the scaler 33 (see FIG. 2(*i*)). After five additional half-clock cycles are received in the scaler 31 following the data shift, the scaler 31 outputs its count of 30. The N-AND gate 58 is thereby enabled, causing a negative pulse to appear on the conductor 60 (see FIG. 2(*j*)). The negative pulse on the conductor 60 is inverted by the N-AND gate 62, permitting a positive voltage to appear on the conductor 92 (see FIG. 2(*l*)). As previously described, the appearance of a positive voltage on the conductor 92 has two effects. It causes the output flip-flop 98 to shift its state, and it also effects a reset of both scalers 31 and 33 in the manner previously described.

With a negative data input, then, the scaler 33 has lost its control over the output flip-flop 98 and such control has passed to the scaler 31. In consequence, the scaler 31 is permitted to count out repeatedly to its count of 30, producing a square wave output at the terminal 99, the frequency of which is controlled by the scaler 31. Since the scaler 31 is receiving a half-clock frequency from the N-AND gate 34 and is counting to 30, the square wave generated by the output flip-flop 98 now has a frequency equal to 1/120 the master clock frequency. This frequency is of course higher than the output frequency derived from the scaler 33 when the data input is positive.

The waveforms illustrated in FIG. 3 are constructed on a time scale which is 1/56 the time scale of FIG. 2 so as to show in FIG. 3(*n*) the output waveform generated by the flip-flop 98. The waveform 3(*l*) illustrates the successive positive pulses on the conductor 92 which cause the output flip-flop 98 to switch between its stable states. The waveform 3(*m*) represents the character of data line that causes the circuit to produce the output waveform shown in Figure 3(*n*).

Figure 3 illustrates the same data shift as appears in FIG. 2. The left half of FIG. 3 thus illustrates receipt of a mark signal and resultant production of a low-frequency output signal in the waveform 3(*n*). The right half of FIG. 3 illustrates receipt of a space signal and the resultant production of a high-frequency output signal in the waveform 3(*n*).

Summarizing the previous circuit description, a positive data input results in an output square wave from the flip-flop 98 which is 1/224 the master clock frequency and a negative data input results in an output frequency from the output flip-flop 98 which is 1/120 the master clock frequency. There has thus been described to this point a circuit which is responsive to mark and space data inputs to produce low- and high-frequency outputs, respectively. While the output waveform shown in FIG. 3(*n*) is represented as a square wave, those skilled in the art will understand that this square wave is ordinarily put through a low pass filter to convert the square wave output to a sine wave for transmission purposes.

As described earlier in this specification, the principal problem to which the present invention is addressed is that of accomplishing a shift between the high- and low-frequency output sine waves which is substantially jitter-free and which may be accomplished asynchronously.

The conditions under which an asynchronous frequency shift can be achieved without appreciable jitter in a signal generator having a square wave output passed to a low pass filter for conversion to a sine wave have been described and mathematically analyzed in the *Bell System Technical Journal* for Nov. 1962, on page 1719 and following pages. While different mathematical symbols are herein used for convenience, the conditions for an ideal or jitter-free asynchronous frequency shift are embodied in the following equation which can be derived from page 1721 of the aforementioned technical journal:

(1) $T=HP_f+T_s(1-HP_f/HP_i)$ in which, $T$ represents that time between the zero crossings which flank the instant of frequency shift which is required for production of an ideal frequency modulated wave;

$HP_i$ is the half period of the output wave being generated immediately prior to the frequency shift;

$HP_f$ is the half period of the output wave which is to be generated after the frequency shift; and $T_s$ is the time lapse between the zero crossing immediately preceding the frequency shift and the instant of frequency shift.

Equation (1) can be rewritten as follows:

(2) $T=T_s+[HP_f-HP_f/HP_i \cdot T_s]$

The circuit of the present invention is designed to accept a data shift whenever it may occur and therefore asserts no control over the time $T_s$. If the scaler 31 is generating a high-frequency output wave, that scaler will control the zero crossings preceding any space to mark shift, and the occurrence of a space to mark shift is what establishes the time $T_s$. During the time the scaler 31 controls the output wave, the scaler 33 may be regarded as a standby or idling scaler.

Correspondingly, when the scaler 33 is controlling or generating a low-frequency output wave, the occurrence of a mark to space data shift establishes the time $T_s$ and until such data shift occurs the scaler 31 may be regarded as a standby or idling scaler.

Whenever a data shift occurs, control of the wave is immediately shifted from the previously controlling g scaler to the standby or idling scaler. Thus, if the data shift is a mark to space shift, control of the output wave switches immediately from the scaler 33 to the scaler 31 and it is the scaler 31 that will effect the next zero crossing of the output wave. Correspondingly, if the data shift is a space to mark data shift, control of the output wave will shift from the scaler 31 to the scaler 33 and it is the scaler 33 that will effect the next zero crossing in the output wave.

Since the circuit of the present invention does not control the time $T_s$, and since it is the standby or idling scaler that will effect the next zero crossing following any data shift, the manner in which the circuit of the present invention can satisfy equation (2) resides solely in the operating characteristics of the standby or idling scaler. Thus, the circuit accepts the data shift whenever it may occur and it is the responsibility of the standby or idling scaler to satisfy equation (2) by effecting the next zero crossing at a time following the data shift which satisfies the bracketed term in equation (2).

It will be shown in the following remarks that the circuit as disclosed very closely, but not exactly, satisfies equation (2). It will also be shown, however, that the operating principle demonstrated by the circuit of this invention can satisfy equation (2) to any degree of perfection desired, the primary limitation on circuit accuracy being practical limitations to circuit complexity and its attendant circuit costs.

The manner in which the circuit satisfies equation (2) is best revealed by first examining the circuit operation upon receipt of a mark to space data shift and then examining the circuit operation upon receipt of a space to mark data shift.

Mark to Space Data Shift

Upon receipt of a mark to space data shift, transfer of the output wave is instantly switched from the scaler 33 to the scaler 31. The scaler 31 effects the next zero crossing in the output wave by counting from whatever count existed on the scaler 31 at the instant of data shift to the count 30.

In the time interval between the preceding zero crossing and the data shift, the scaler 31 had been receiving counts at the quarter-clock frequency. This input of counts to the scaler 31 had the effect of reducing the number of counts that would be permitted to occur in the scaler 31 between the instant of the data shift and the next zero crossing. In practical effect, the time that would lapse from the data shift to the next zero crossing was being decreased in proportion to the time actually lapsing from the preceding zero crossing to the data shift. Since the scaler 31 is receiving counts half as fast as the scaler 33, the count on the scaler 31 at the instant of a mark to space data shift multiplied by the half-clock period equals, to a close approximation, one-half the time $T_s$. Thus, at the instant of a mark to space data shift, the time lapse following the data shift to the next zero crossing will be the high-frequency half period (a full count of 30 on the scaler 31 at the half-clock frequency) reduced by the time $\frac{1}{2}\cdot T_s$.

By way of contrast, the bracketed expression of equation (2) requires that the time lapse from the data shift to the next zero crossing be the high-frequency half period reduced by $30/56\cdot_s$. The extent of deviation between circuit performance and the requirements of equation (2) resides only in the fact that the time lapse from the data shift to the next zero crossing is the high-frequency half period reduced by $\frac{1}{2}\cdot T_s$ when it should be the high-frequency half period reduced by $30/56\cdot T_s$.

Since the deviation appears in the coefficient of $T_s$ within the bracketed expression of equation (2), it is apparent that the deviation increases as $T_s$ increases. Thus, when $T_s$ is zero (data shift coincides with zero crossing), the circuit of this invention exactly satisfies equation (1). On the other hand, when data shift occurs at count 55 of the scaler 33 and therefore count 27 of the scaler 31, $T_s$ is as large as can occur without the data shift coinciding with a zero crossing effected by the scaler 33. It is at this point that maximum deviation between circuit performance and the requirements of equation (2) occurs.

Should a data shift occur at this point of maximum deviation, the scaler 31 will assume control of the output wave and will not effect the next zero crossing until it has received three counts at the half-clock frequency, or, more exactly, until two and one-half periods or less of the half-clock frequency have elapsed. With reference to equation (2), the time $T_s$ at the instant of such data shift is that time required for 57 counts of the scaler 33, i.e., 57 periods of the half-clock frequency. From equation (1), the optimum time lapse following such data shift should be $30-30/56\cdot 57=0.5$ periods of the half-clock frequency. The maximum deviation from the ideal interval between zero crossings flanking a mark to space data shift is thus two periods of the half-clock frequency. Since the half-clock frequency is 60 times greater than the high frequency output wave which follows a mark to space data shift, the deviation from an ideal jitter-free zero crossing will be not more than two parts in 60, i.e., 3.3 percent.

Space to Mark Data Shift

When the data shift is from a space to a mark, the scaler 31 controls the output wave immediately preceding the data shift and upon receipt of a data shift control of the output wave is switched to the scaler 33. Whenever the data shift should occur, the time lapse from the instant of data shift to the next zero crossing is that time required for the scaler 33 to count from whatever count existed thereon at the instant of data shift to the count 56. Since the scaler 33 is unable to effect a zero crossing during generation of the high-frequency output wave representing a space input, and thus is capable of counting as far as 60, two different operating circumstances can result. A space to mark data shift might occur when the count on the scaler 33 is less than 56 in which case the scaler 33 must then count to 56 at the half-clock frequency to effect the next zero crossing. On the other hand, a data shift might occur between counts 56 and 60 of the scaler 33, whereupon the data shift will immediately enable the N-AND gate 82 through the conductor 80, thereby effecting an immediate zero crossing of the output wave.

The nature of the deviation described in relation to the mark to space data shift was production of a delayed zero crossing in the output wave following a data shift. A deviation can also occur in a space to mark data shift, but in this case the deviation is a premature zero crossing following the data shift. The maximum deviation occurs when the scaler 33 is at count 56 and the scaler 31 is at count 28. Should a space to mark data shift then occur, the scaler 33 will immediately effect a zero crossing in the output wave. However, equation (2) required that the zero crossing follow the data shift by a period of time equal to $56-56/30\cdot T_s$. If the data shift occurs at count 28 of the scaler 31, $T_s$ is 28 periods of the half-clock frequency. Accordingly, the zero crossing should follow the data shift by $56-56/30.\ 28=3.5$ periods of the half-clock frequency. Since this deviation appears in the low-frequency output wave which follows the data shift, the deviation is not more than 3/5 parts in 112 parts, i.e., less than 3.2 percent.

The particular circuit disclosed is designed to produce high and low-frequency output waves in a range deemed suitable for telephone voice band transmission. For convenience, the master clock frequency is controlled by a piezoelectric crystal resonant at 256 kilocycles. Accordingly, the half-clock signal is 128 kilocycles and the frequency modulated mark and space output signals are 1,143 cycles and 2,133 cycles, respectively. Those skilled in the art will recognize from the foregoing description, however, that one could employ different clock frequencies and different scaler capacities to more closely approximate a jitter-free circuit performance than that achieved with the circuit described. Thus, the particular clock frequencies employed and the particular scaler capacities employed may be adjusted as desired to obtain whatever degree of jitter control is desired. It is also to be recognized that the present circuit may be adapted to any ratio of output frequencies desired.

Those skilled in the art will further recognize that, in those cases where the ratio of frequency modulated output signals can be exactly two-to-one, the present circuit is readily adapted to produce a nearly perfect jitter-free frequency shifting since it poses no problem to adjust the ratio of count capacities in the scalers 33 and 31 to a two-to-one ratio.

In this special circumstance, both scalers will always count out to their predetermined count levels at the same instant and accordingly one of the scalers becomes surplusage. Thus, if an output frequency ratio of two-to-one is acceptable to the remote receiver, a substantially jitter-free frequency shift can be accomplished at the transmitter using only one clock signal, one half-clock signal, and one scaler. This special circumstance can be extended to a more general case: if two clock frequencies are available which have a ratio therebetween exactly equal to the desired output frequency ratio, the two available clock frequencies and a single scaler can be used to effect a substantially jitter-free frequency shift at the transmitter.

Figure 4:
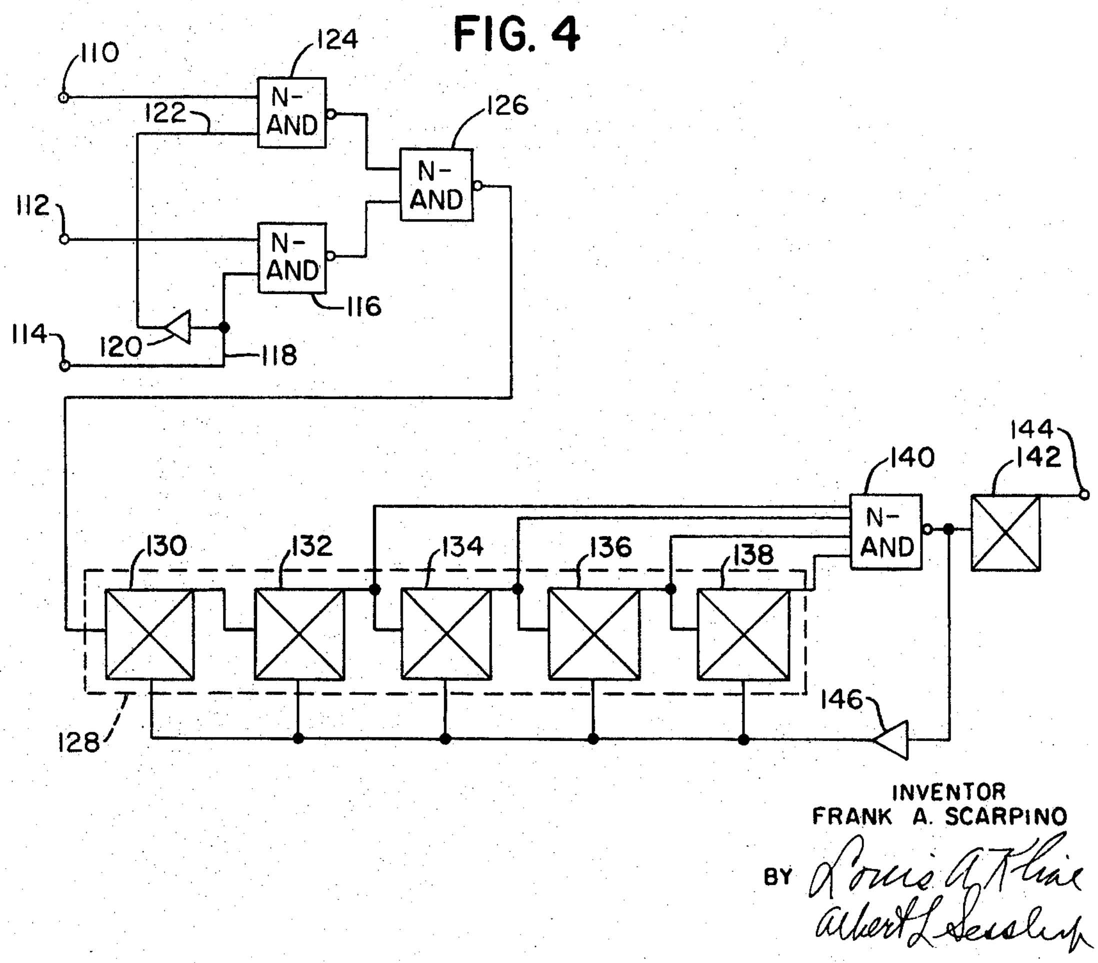
FIG. 4 is a schematic diagram of a second embodiment of the invention.

FIG. 4 is a schematic diagram of an electrical circuit embodying the present invention, which is suitable for use in the circumstances in which two clock frequencies are available which have a ratio therebetween exactly equal to the desired output frequency ratio. In this embodiment, the terminals marked with the reference characters 110 and 112 represent clock input terminals similar to the input terminal 10 of FIG. 1 to which the master clock is applied. The clock signals applied to terminals 110 and 112 bear the same frequency relation to each other that the output frequencies for the circuit of FIG. 4 bear to each other. If desired, one of the two clock signals at the terminals 110 and 112 may be derived from the other by means of a flip-flop or other suitable device, in the event that the two clock signals are in a suitable ratio to each other, such as the two-to-one ratio mentioned above. The binary data input to the circuit of FIG. 4, corresponding to the input to terminal 20 of FIG. 1, is applied to terminal 114. The input data signal is applied directly to NAND gate 116 through a conductor 118, and is also inverted through an inverter 120 and applied through a conductor 122 to a NAND gate 124. The clock signals applied to terminals 110 and 112 also appear on inputs of NAND gates 124 and 116. The outputs of these NAND gates are applied as inputs to a NAND gate 126, the output of which is applied to a scaler or cycle counter 128 comprising a suitable number of bistable elements, illustrated in FIG. 4 as bistable flip-flops 130, 132, 134, 136, and 138. Outputs from the flip-flops 132, 134, 136, and 138 are applied to inputs of a NAND gate 140, the output of which serves as a trigger to an output flip-flop 142, having an output terminal 144 on which the output signal for the circuit of FIG. 4 appears. The output of the NAND gate 140 is also applied through an inverter 146 to reset the flip-flops 130, 132, 134, 136, and 138 of the scaler 128 when the capacity of such scaler is reached. It will be seen from an examination of FIG. 4 and from the explanation contained herein that the circuit of FIG. 4 is essentially the duplicate of one of the scalers of FIG. 1, with associated input and output devices, and functions in a similar manner.

It is when the desired output frequency ratio cannot be matched by a ratio between readily available clock sources that a second scaler as disclosed in the present invention is required to achieve nearly jitter-free circuit performance.

Having thus described my invention, I claim:

1. A circuit for use in translating a data signal shifting between two signal levels to a frequency modulated output signal shifting between two frequencies one of which is a multiple of the other, comprising, in combination, means producing first and second clock signals of different frequencies, one of which bears the same multiple relation to the other as do the two output signal frequencies, cycle counter means having a zero count state and adapted to provide an output after receiving a predetermined number of cycles of a clock signal, input means receiving said data signal and responding to one level of said data signal to apply said first clock signal to said counter means, said input means responding to the other level of said data signal to apply said second clock signal to said counter means, signal output means having two signal states and responding to an output of said counter means to change its signal state, and means responsive to the output of said counter means to return said counter means to said zero count state.

2. The circuit of claim 1 wherein said counter means includes a scaler comprising at least one flip-flop.

3. The circuit of claim 1 wherein said output means is a bistable device.

4. The circuit of claim 3 wherein said bistable device is a second flip-flop.

5. A circuit for use in translating a data signal shifting between two signal levels to a frequency modulated output signal shifting between two frequencies comprising, in combination, means producing first and second pairs of clock signals, the clock signal frequencies being different in each of said pairs and the ratio of higher-to-lower clock signal frequencies being approximately the same in each pair, first and second cycle counter means each having a zero count state and each adapted to provide an output after receiving a predetermined number of cycles for said second counter means, input means receiving said data signal and responding to one level of said data signal to apply the lower frequency one of said first pair of clock signals to said first counter means and the other of said first pair of clock signals to said second counter means, said input means responding to the other level of said data signal to apply the lower frequency one of said second pair of said clock signals to said first counter means and the other of said second pair of said clock signals to said second counter means, signal output means having two signal states and responding to the outputs of either one of said first and second counter means to change its signal state, and means responsive to the outputs of either one of said first and second counter means to return each of said counter means to its zero count state.

6. The circuit of claim 5 including means responsive to one of said data signal levels to inhibit the output of one of said counter means.

7. The circuit of claim 5 wherein the higher frequency of one of said pairs of clock signals is equal to the lower frequency of the other of said pairs of clock signals.

8. A circuit for use in translating a data signal shifting between two signal levels to a frequency modulated output signal shifting between two frequencies comprising, in combination, clock means producing first, second and third clock signals, the frequency of said first clock signal being that of said second clock signal multiplied by a first multiplier, the frequency of said second clock signal being that of said third clock signal multiplied by approximately said first multiplier, first and second counting means to count cycles of said clock signals, each said counting means counting between zero and a predetermined count, each said counting means producing an output signal upon reaching its predetermined count, the predetermined count of said second counting means being the predetermined count of said first counting means multiplied by approximately said first multiplier, input means receiving said data signals and responding to one level of said data signals to apply said second clock signal to said first counting means and to simultaneously apply said first clock signal to said second counting means, said input means responding to the other signal level of said data signal to apply said second clock signal to said second counting means and to simultaneously apply said third clock signal to said first counting means, output signal generating means switchable between two signal states for producing said frequency modulated signal, means responsive to an output signal from either one of said counting means to produce a pulse for switching said output signal generating means, and means responsive to said pulse to reset both of said counting means to zero.

9. The circuit of claim 8 wherein said first and second counting means each comprise a scaler having at least one flip-flop.

10. The circuit of claim 8 wherein said output signal generating means comprises a bistable device and said signal states are stable states of said bistable device, said frequency modulated output signal comprising a square wave signal generated by said bistable device.

11. The circuit of claim 8 including means to inhibit an output signal from one of said counting means whenever said second clock signal is applied to the other of said counting means.

12. The circuit of claim 11 wherein said one counting means is said second counting means, the predetermined count of said first counting means is 30 counts and the predetermined count of said second counting means is 56 counts.

13. The circuit of claim 12 wherein said first clock signal has a frequency of 256,000 cycles/sec. and said first multiplier is the integer 2.

UNITED STATES PATENT OFFICE
CERTIFICATE OF CORRECTION

Patent No. 3,614,624 Dated October 19, 1971

Inventor(s) Frank A. Scarpino

It is certified that error appears in the above-identified patent and that said Letters Patent are hereby corrected as shown below:

Column 10, line 6, after "cycles" insert -- of a clock signal, the predetermined number of cycles for said first counter means being smaller than the predetermined number of cycles --.

Signed and sealed this 29th day of August 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334